(12) United States Patent
Anderson et al.

(10) Patent No.: US 7,315,980 B2
(45) Date of Patent: Jan. 1, 2008

(54) METHOD AND APPARATUS FOR GENERATING ELECTRONIC DOCUMENT DEFINITIONS

(75) Inventors: Rayne S. Anderson, Charlotte, NC (US); Brenda H. High, Charlotte, NC (US); Peter J. Lynch, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/102,766

(22) Filed: Mar. 21, 2002

(65) Prior Publication Data

US 2003/0208720 A1 Nov. 6, 2003

(51) Int. Cl.
*G06F 17/00* (2006.01)
*G06F 15/00* (2006.01)
*G06F 17/30* (2006.01)
*G06F 7/00* (2006.01)

(52) U.S. Cl. .................... 715/513; 715/500; 707/2; 707/102

(58) Field of Classification Search ............. 715/500, 715/523, 513; 707/102, 2
See application file for complete search history.

(56) References Cited

U.S. PATENT DOCUMENTS

| | | | |
|---|---|---|---|
| 6,067,414 A | 5/2000 | Wang et al. .............. 395/702 |
| 6,125,391 A | 9/2000 | Meltzer et al. .............. 709/223 |
| 6,249,794 B1* | 6/2001 | Raman .................... 715/500 |
| 6,253,366 B1* | 6/2001 | Mutschler, III ............ 717/104 |
| 6,263,332 B1 | 7/2001 | Nasr et al. ................ 707/5 |
| 6,279,015 B1 | 8/2001 | Fong et al. .............. 707/523 |
| 6,289,501 B1 | 9/2001 | Mutschler, III ........... 717/1 |
| 6,330,569 B1 | 12/2001 | Baisley et al. ............ 707/203 |
| 6,356,920 B1* | 3/2002 | Vandersluis ............. 715/501.1 |
| 6,381,737 B1* | 4/2002 | Click et al. .............. 717/136 |
| 6,407,761 B1* | 6/2002 | Ching et al. .............. 715/835 |
| 6,411,961 B1* | 6/2002 | Chen ....................... 707/102 |
| 6,542,912 B2* | 4/2003 | Meltzer et al. .......... 715/501.1 |
| 6,621,505 B1* | 9/2003 | Beauchamp et al. ........ 715/764 |
| 6,701,381 B2* | 3/2004 | Hearne et al. ............. 719/313 |
| 6,708,074 B1* | 3/2004 | Chi et al. ................. 700/121 |

(Continued)

FOREIGN PATENT DOCUMENTS

CA 2255017 5/2000

(Continued)

OTHER PUBLICATIONS

"Using bTalk for XML", web.archive.org/web/20010803153154/htttp://ww.btalk.com/content_btalkxml.cfm, Aug. 3, 2001, pp. 1-2.*

(Continued)

*Primary Examiner*—Shahid Alam
*Assistant Examiner*—Robert Stevens
(74) *Attorney, Agent, or Firm*—Akerman Senterfitt

(57) ABSTRACT

A method of automatically creating an electronic document definition can include querying an application using a meta data interface of the application to obtain meta data describing at least one other interface of the application. The meta data can be received responsive to the querying. The meta data can be processed to determine at least one electronic document definition describing the at least one other interface in accordance with the received meta data and a message specification of the application.

12 Claims, 10 Drawing Sheets

U.S. PATENT DOCUMENTS

| | | | |
|---|---|---|---|
| 6,718,535 B1* | 4/2004 | Underwood | 717/101 |
| 6,721,713 B1* | 4/2004 | Guheen et al. | 705/1 |
| 6,738,975 B1* | 5/2004 | Yee et al. | 719/310 |
| 6,753,889 B1* | 6/2004 | Najmi | 715/784 |
| 6,810,429 B1* | 10/2004 | Walsh et al. | 709/246 |
| 6,871,204 B2* | 3/2005 | Krishnaprasad et al. | 707/102 |
| 6,874,146 B1* | 3/2005 | Iyengar | 719/313 |
| 6,904,432 B2* | 6/2005 | Charlot et al. | 707/9 |
| 6,918,122 B2* | 7/2005 | Matula et al. | 719/316 |
| 6,996,831 B1* | 2/2006 | Zoller et al. | 719/331 |
| 7,093,195 B2* | 8/2006 | Lynch et al. | 715/513 |
| 7,130,842 B2* | 10/2006 | Lynch et al. | 707/3 |
| 7,152,090 B2* | 12/2006 | Amirisetty et al. | 709/200 |
| 2001/0032218 A1 | 10/2001 | Huang | 707/513 |
| 2001/0047372 A1 | 11/2001 | Gorelik et al. | 707/514 |
| 2002/0002566 A1 | 1/2002 | Gajraj | 707/513 |
| 2002/0010781 A1 | 1/2002 | Tuatini | 709/227 |
| 2002/0013790 A1 | 1/2002 | Vandersluis | 707/514 |
| 2002/0038309 A1* | 3/2002 | Perkins et al. | 707/104.1 |
| 2002/0169788 A1* | 11/2002 | Lee et al. | 707/104.1 |
| 2003/0018832 A1* | 1/2003 | Amirisetty et al. | 709/328 |
| 2003/0101251 A1* | 5/2003 | Low | 709/223 |
| 2003/0145047 A1* | 7/2003 | Upton | 709/203 |
| 2003/0182452 A1* | 9/2003 | Upton | 709/246 |
| 2004/0205573 A1* | 10/2004 | Carlson et al. | 715/513 |
| 2006/0059107 A1* | 3/2006 | Elmore et al. | 705/64 |

FOREIGN PATENT DOCUMENTS

| | | |
|---|---|---|
| EP | 1 037 151 | 9/2000 |
| EP | 1 122 652 | 8/2001 |
| KR | 2001067859 | 7/2001 |

OTHER PUBLICATIONS

"Interface Repository (IFR) for Collaborative Business Scenarios", web.archive.org/web/20010420004937/http://ifr.sap.com/home/Documents/ifr.htm, Apr. 20, 2001, pp. 1-3.*

Golfarelli, Matteo, et al., "Data Warehouse Design from XML Sources", DOLAP '01, Atlanta, GA, Nov. 9, 2001, pp. 40-47 [ACM 1-58113-437-1/01/0011].*

Garofalakis, Minos, et al., "XTRACT: A System for Extracting Document Type Descriptors from XML Documents", MOD 2000, Dallas, TX, May 2000, pp. 165-176 [ACM 1-58113-218-2/00/05].*

Huang, Anita, et al., "A Semantic Transcoding System to Adapt Web Services for Users with Disabilities", ASSETS '00, Arlington, VA, Nov. 11-13, 2000, pp. 156-163 [ACM 1-58113-314-8/00/0011].*

Papakonstantinou, Yannis, et al., "DTD Inference for Views of XML Data", POD 2000, Dallas, TX, May 2000, pp. 35-46 [ACM 1-58113-218-x/00/05].*

Morrison, Michael, et al., XML Unleashed, Sams Publishing, Indianapolis, IN, Dec. 1999, pp. 9-37, 47-64, 84-108, 636-646 and 654-668.*

Smith, Connie U., "SPE Models for Multi-Tier Client/Server Interactions with MQSeries and Other Middleware", Proceedings of the Computer Measurement Group, © 1999, pp. 1-10.*

Wackerow, Dieter, MQSeries Primer, IBM MQ Enterprise Application Integration (EAI) Center, Oct. 1999, pp. 1-34.*

Lambros, Peter, et al., "Combine Business Process management Technology and Business Services to Implement Complex Web Services", IBM Web Services, © 2001, pp. 1-27.*

Penix, John, et al., "Automating Component Integration for Web-Based Data Analysis", 2000 IEEE Aerospace Conference Proceedings, vol. 4, Big Sky, MT, Mar. 18-25, 2000, pp. 465-473.*

McFall, Cynthia, "An Object Infrastructure For Internet Middleware", IEEE Internet Computing, Mar./Apr. 1998, pp. 46-51.*

M. Biscarrat, *XML@SAP*, SAP AG, <http://www.sap.com>, (2001).

*Ariba Buyer MQSeries Integration White Paper*, IBM Corp., <http://www-3.ibm.com/software/ts/mqseries/adapter/ws/library/ariba/whitepaper.html>, (Viewed Feb. 25, 2002).

*Interface Repository (IFR) for Collaborative Business Scenarios*, SAP, <http://ifr.sap.com/home/Documents/ifr.htm>, (Viewed Feb. 13, 2002).

C. Ruey-Shun, et al., A Web-Based Data Extraction System for Supply Chain Management Using SAP R/3, *Proc. of IEEE Int. Conf. on Systems, Man and Cybernetics*, vol. 4, pp. 2557-2562, (Oct. 7-10, 2001).

The XML Scorecard for 3Q00, *Software Economics Letter*, vol. 9, No. 8, pp. 1-3, (Aug. 2000).

T. Dubernet, et al., Base System Products-Product Data Management With Technological Variety, *ComTec*, vol. 78, No. 4, pp. 28-32, (2000).

M. Aleksy, et al., Interoperability of Java-Based Applications and SAP's Business Framework State of the Art and Desirable Developments, *Proc. of Int. Symp. On Distributed Objects and Applications*, pp. 190-200, (1999).

D. Ritter, XML: The Missing Link for B2B E-Commerce, *Intelligent Enterprise*, vol. 2, No. 7, pp. 30-2-36-7, (May 11, 1999).

*Seeburger Receives Official SAP XML Certification for the BIS/SAP XML Interface*, <http://www.seeburger.com>, Aug. 7, 2000.

J. Schwartz, SAP Embraces Java and XML, *InternetWeek*, <http://www.internetweek.com/news1298/news121098-9.htm>, (Dec. 10, 1998).

Chopra, et al., XML-EDI Application Architecture, *Research Disclosure*, N. 450, Art. 92, p. 1722 (Oct. 2001).

Conversion of Final Form Data, Such as AFP, to XML, *Research Disclosure*, No. 444, Art. 208, p. 709, (Apr. 2001).

bTalk—Web-Enabling SAP, *Backsoft Corp.*, <http://www.btalk.com/content_btalkxml.cfm>, (Viewed Feb. 13, 2002).

Method and Program to Generate Abritrary XML from a Java Hash Table . . . , *Research Disclosure*, No. 440, Art. 132, (Dec. 10, 2000).

Program Using XML to Generate Programming Tools for A Complex Program . . . , *Research Disclosure*, No. 434, Art. 153, (Jun. 10, 2000).

* cited by examiner

METHOD AND APPARATUS FOR GENERATING ELECTRONIC DOCUMENT DEFINITIONS

RELATED APPLICATION

This Application is related to U.S. patent application Ser. No. 10/102,764, filed Mar. 21, 2002, and assigned to the same assignee to which this Application is assigned.

BACKGROUND OF THE INVENTION

1. Technical Field

The invention relates to the field of application integration, and more particularly, to the generation of components for integrating different enterprise level applications.

2. Description of the Related Art

Enterprise resource planning (ERP) systems typically are multi-module software applications which help organizations manage diverse aspects of their business such as product planning, parts purchasing, maintaining inventories, interacting with suppliers, providing customer service, and tracking orders. ERP systems further can manage financial and human resource aspects of a business. For example, Systems, Application and Products in Data Processing (SAP), AG of Walldorf Germany provides a comprehensive set of integrated business applications known as mySAP-.com™.

Conventional ERP systems have begun incorporating extensible markup language (XML) functionality in an effort to facilitate information exchange with other disparate ERP systems and applications. In consequence, XML documents can be used to interface ERP systems such as mySAP.com with middleware messaging systems and applications. Although XML can provide a robust platform for interaction among disparate applications and systems, conventional ERP system manufacturers typically utilize proprietary XML message formats within their ERP systems which are not common to other ERP systems. In consequence, a middleware messaging system often must translate one proprietary ERP system message format, whether XML or not, to another proprietary ERP system message format. Further, the middleware messaging system often must translate the proprietary XML message format into an intermediate format used by the middleware itself.

For example, MQSeries™ is a middleware business integration software package available from International Business Machines Corporation of Armonk, N.Y. MQSeries can mediate between different ERP systems or applications. Through its various software components, MQSeries can provide a communication mechanism between applications on different platforms, centralized application of business operations rules, and workflow management enabling the capture, visualization, and automation of business processes.

Middleware systems utilize software components referred to as adapters for converting one form of XML to another. Products such as IBM's MQSeries Adapter Builder can generate these adapters. To generate such an adapter, a document type definition (DTD) describing the particular interface to the ERP system must be imported into the adapter generation tool. Many ERP systems, however, provide only a generic description of the structure of XML documents used to interact with the ERP system. Such ERP systems do not describe specific interfaces, nor do the ERP systems provide DTDs which are associated with specific interfaces. For example, the SAP provided interfaces include only XML runtime formats.

In consequence, the DTD must be manually generated so that it can be imported into the adapter builder tool. The manual creation of a DTD, however, introduces the possibility of human error into the creation of adapters. Additionally, the manual nature of DTD creation requires additional time not only for creating the DTDs and adapters, but also for future modifications of the DTDs and adapters.

SUMMARY OF THE INVENTION

The present invention provides for the automatic generation of electronic document definitions for specifying interfaces to enterprise resource planning (ERP) systems and applications. In particular, the present invention can query an ERP system and/or application using an interface provided by the ERP system itself to obtain meta data describing the various other interfaces of the ERP system. The meta data can be processed to determine an electronic document definition which describes a particular interface to the ERP system. The electronic document definition can be a document type definition (DTD), an extensible markup language (XML) schema, or another markup language document such as a hypertext markup language (HTML) document. Notably, the resulting electronic document definition can comply with the generalized XML specifications defined by the ERP system.

One aspect of the present invention can include a method of automatically creating an electronic document definition. The method can include querying an application using a meta data interface of the application itself to obtain meta data describing at least one other interface of the application. For example, the meta data interface and the at least one other interface can be specified within and read from an input mechanism such as a data file. The meta data can be received responsive to the querying and then processed. Specifically, the meta data can be processed to determine at least one electronic document definition describing the at least one other interface in accordance with the received meta data and a message specification of the application. The electronic document definition can be a DTD, an XML schema, or another markup language document such as an HTML document.

Notably, the type of interface being described by the meta data can be determined. For example, the interface type can be identified as a remote function call, an intermediate document, or a business application programming interface. For meta data describing a remote function call interface or a business application programming interface, a request electronic document definition and a response electronic document definition can be determined.

The meta data can specify at least one parameter which can be processed to determine whether the parameter is mandatory and whether the parameter is imported, exported, or both. The meta data further can specify at least one field which can be processed to determined a type of the field and whether the field is associated with a table.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides for the automatic generation of electronic document definitions for specifying interfaces to enterprise resource planning (ERP) systems as well as other application programs. In particular, the present invention can query an ERP system using an interface provided by the ERP system itself. Through an ERP system meta data interface, meta data describing the other interfaces to the ERP system can be obtained. The meta data can be processed to determine an electronic document definition such as a document type definition (DTD), an extensible markup language (XML) schema, or a hypertext markup language (HTML) document describing particular interfaces to the ERP system. Notably, the resulting electronic document definition can comply with the generalized XML specifications provided by the ERP system.

Figure 1:
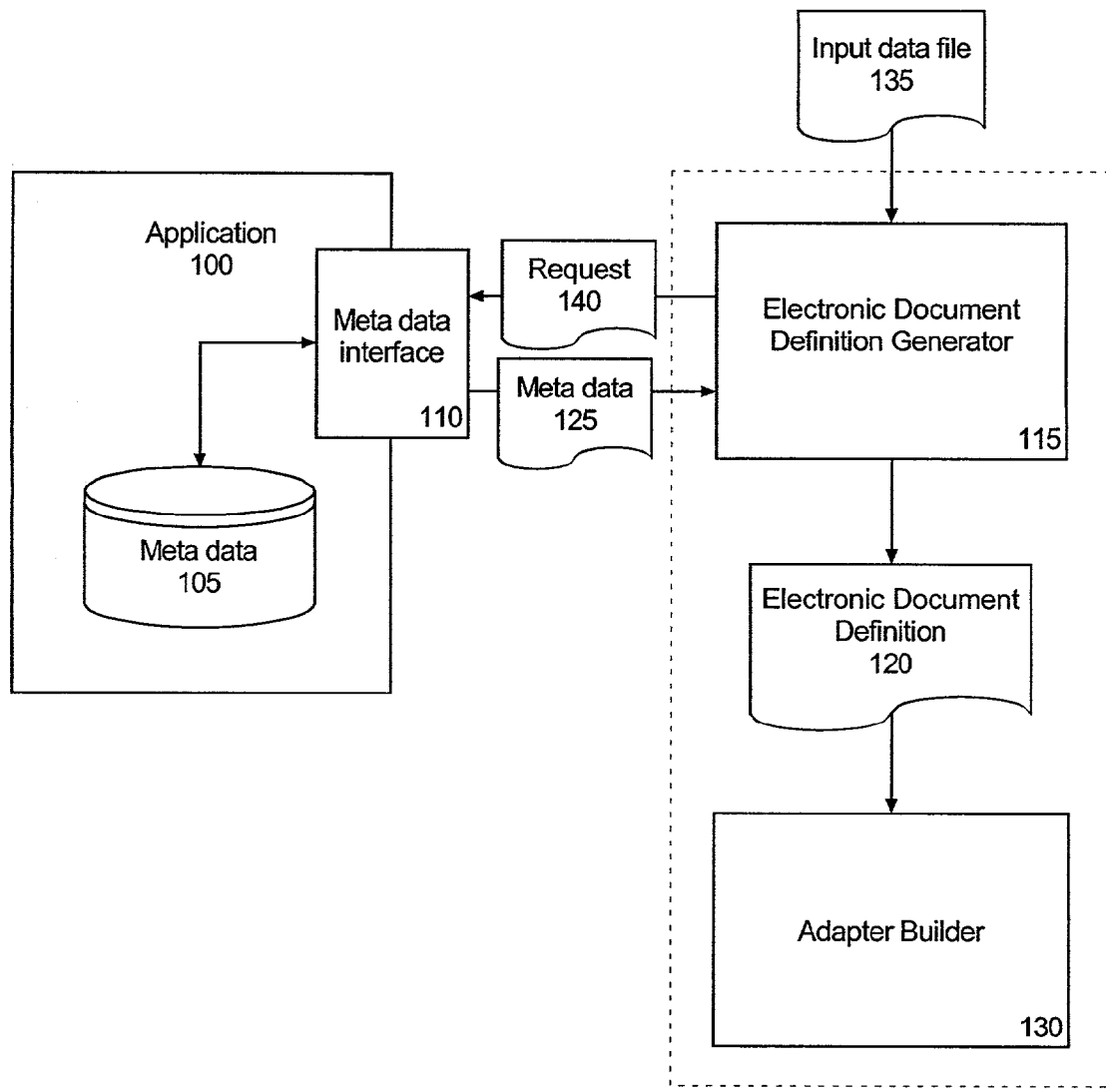
FIG. 1 is a schematic diagram illustrating a system for generating an electronic document definition in accordance with the inventive arrangements disclosed herein.

FIG. 1 is a schematic diagram illustrating a system for generating an electronic document definition in accordance with the inventive arrangements disclosed herein. As shown in FIG. 1, the system can include an application 100, an electronic document definition generator (generator) 115, as well as an adapter builder 130. As mentioned, the application 100 can be an ERP system such as the mySAP.com v1.1 electronic business platform provided by SAP AG of Walldorf Germany.

The ERP system 100 can include a defined application programming interface (API) having a meta data interface 110 and a meta data repository 105. The meta data interface 110 provides external applications and tools with a means by which to access the meta data repository 105. The meta data repository 105 stores meta data which describes the various interfaces to the ERP system 100. The interfaces allow applications and systems to exchange information with the ERP system 100 as well as access various functions of the ERP system 100. The interfaces, for example the interfaces of the mySAP.com electronic business platform, can be classified into three separate categories. The interfaces can be SAP defined data containers referred to as intermediate documents (IDocs), remote function calls (RFCs), or business application programming interfaces (BAPIs). The interfaces can be pre-defined interfaces included within the ERP system 100, or alternatively, can be provided by a user of the ERP system 100. Regardless, the meta data within the meta data repository 105 describes the various interfaces of the ERP system 100. In particular, the meta data can describe the data structures, titles, and different subsections, including individual inputs, outputs, as well as data values for the various interfaces of the ERP system 100.

The generator 115 can be configured to access the ERP system 100 meta data interface 110 to obtain meta data from the meta data repository 105. The generator 115 can determine the particular interface or interfaces for which the corresponding meta data is to be obtained as well as the meta data interface 110 itself from an input data file 135. Thus, using the meta data interface 110 of EPR system 100, the generator 115 can transmit a meta data request 140 for meta data corresponding to one or more ERP system 100 interfaces as specified in the input data file 135. The ERP system 100 can provide the requested meta data 125. The generator 115 can be configured to process the received meta data 125 and then generate an electronic document definition 120. The resulting electronic document definition 120, for example, can be a DTD, an XML schema, or another markup language document such as an HTML document.

The adapter builder 130 can be configured to generate adapters for the ERP system 100 interfaces. An example of such an adapter builder tool is the MQSeries Adapter Builder which is available from International Business Machines Corporation of Armonk, N.Y. The adapter builder 130 can import an electronic document definition 120 such as a DTD. From the electronic document definition 120, the adapter builder 130 can generate an adapter for communicating with the ERP system 100. Accordingly, the adapter can be used to communicatively link an application or ERP system 100 with a middleware application or system. Additional adapters can be included for processing other message formats thereby enabling the middleware to mediate between multiple applications and/or ERP systems. For example, the adapters can convert proprietary XML messages to other message formats including XML and formats which are compliant with business object definition structure (BOD) as promulgated by the Open Applications Group. Although the generator 115 and the adapter builder 130 are depicted as independent applications, those skilled in the art will recognize that the generator 115 and the adapter builder 130 can be included within a single larger tool for use in generating adapters for middleware systems.

Figure 2:
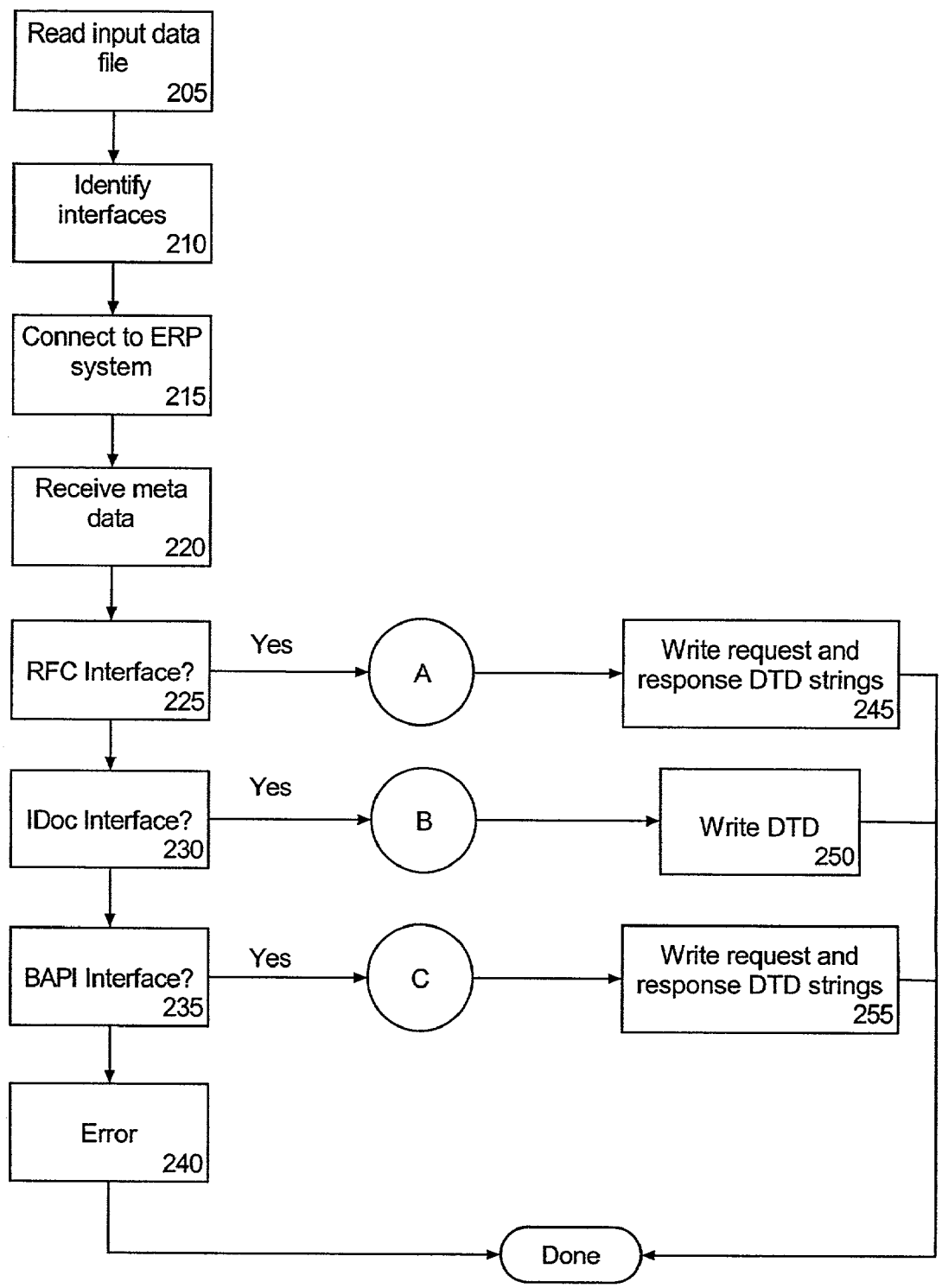
FIG. 2 is a flow chart illustrating a method of automatically generating an electronic document definition as performed by the system of FIG. 1.

FIG. 2 is a flow chart illustrating a method of automatically generating an electronic document definition as performed by the system of FIG. 1. As shown, the method can begin in step 205 where an input data file can be read. As mentioned, the input data file can specify both the ERP system interfaces for which meta data is to be obtained (target interfaces) as well as the meta data interface to be used in obtaining the meta data. Accordingly, in step 210, the target interfaces and the ERP system meta data interface can be identified from the input data file.

In step 215, the generator can access the meta data interface and connect to the ERP system to submit a request for the meta data associated with the target interfaces. In step 220, the meta data describing the target interface or interfaces can be received by the generator. During the following steps 225, 230, and 235, the meta data describing the target interface can be analyzed to determine the type of ERP system interface that is described. Taking the previous example relating to mySAP.com, there are three possible interface types, RFCs, IDocs, and BAPIs. Each of the respective interface types requires particular data formatting.

In step 225, if the meta data describes an RFC interface, the method can continue to jump circle A for processing of the RFC meta data. If not, the method can continue to step 230. In step 230, if the meta data describes an IDoc interface, the method can proceed to jump circle B for processing of the IDoc meta data. If not, the method can continue to step 235, where a determination can be made as to whether the meta data describes a BAPI type interface. If so, the method can proceed to jump circle C for processing of the BAPI meta data. If the meta data does not describe one of the aforementioned interface types, the method can continue to step 240 where an error message can be generated.

After processing the meta data and returning from any of jump circles A, B, or C, the data identified and determined from each interface type process, having been stored within temporary data structures, can be written to an electronic document definition in each of steps 245, 250, and 255. As mentioned, the electronic document definition can be a DTD, an XML schema, or other markup language document. Notably, while the IDoc interface requires a single electronic document definition, both the BAPI and RFC type interfaces require a request electronic document definition specifying data to be provided to the ERP system and a response electronic document definition specifying data to be received from the ERP system. Also, those skilled in the art will recognize that steps 225, 230, and 235 can be repeated as necessary to process further meta data associated with additional ERP system interfaces.

Figure 3A:
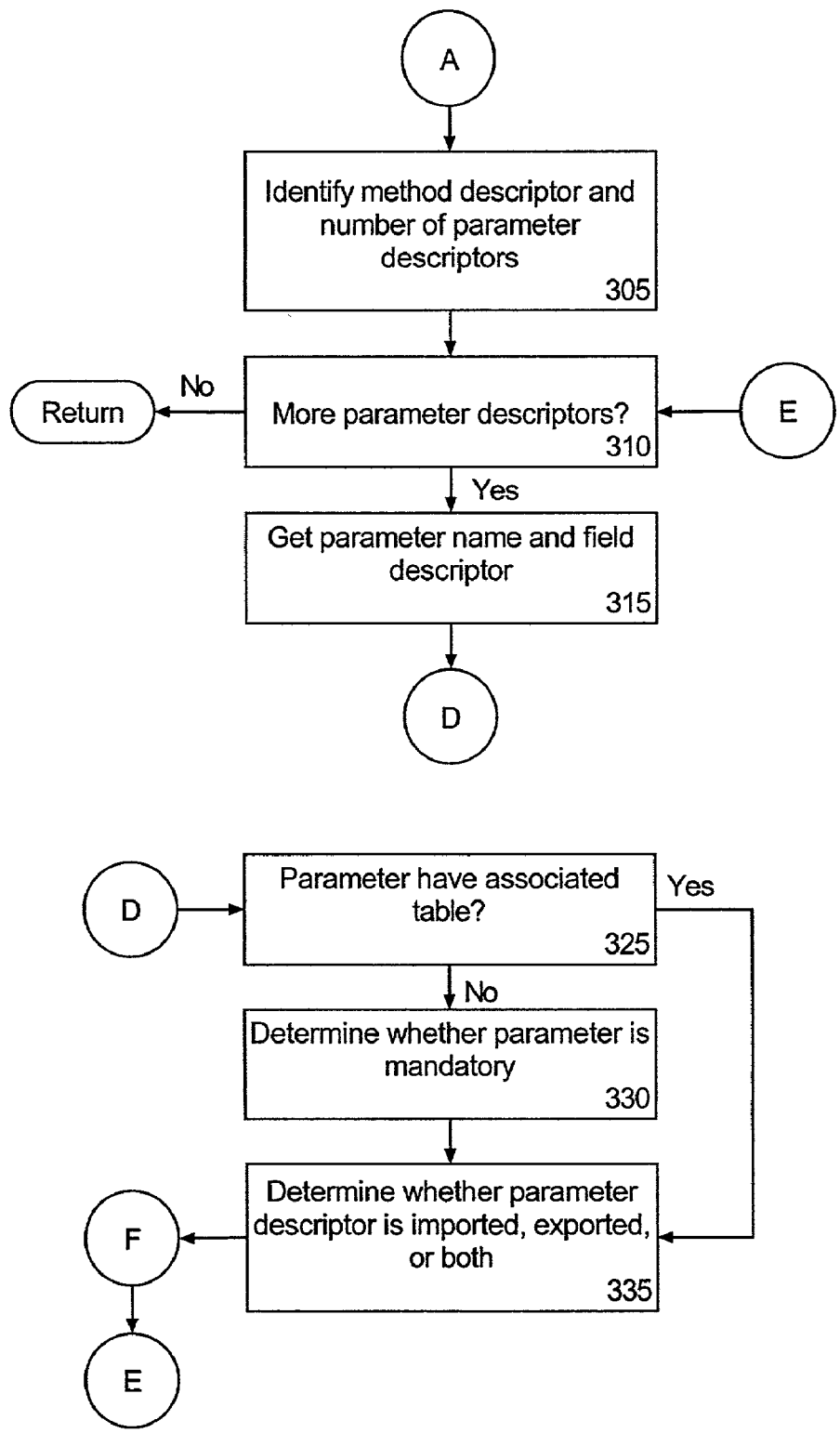
FIG. 3A is a series of flow charts illustrating methods for processing remote function call meta data.
Figure 3B:
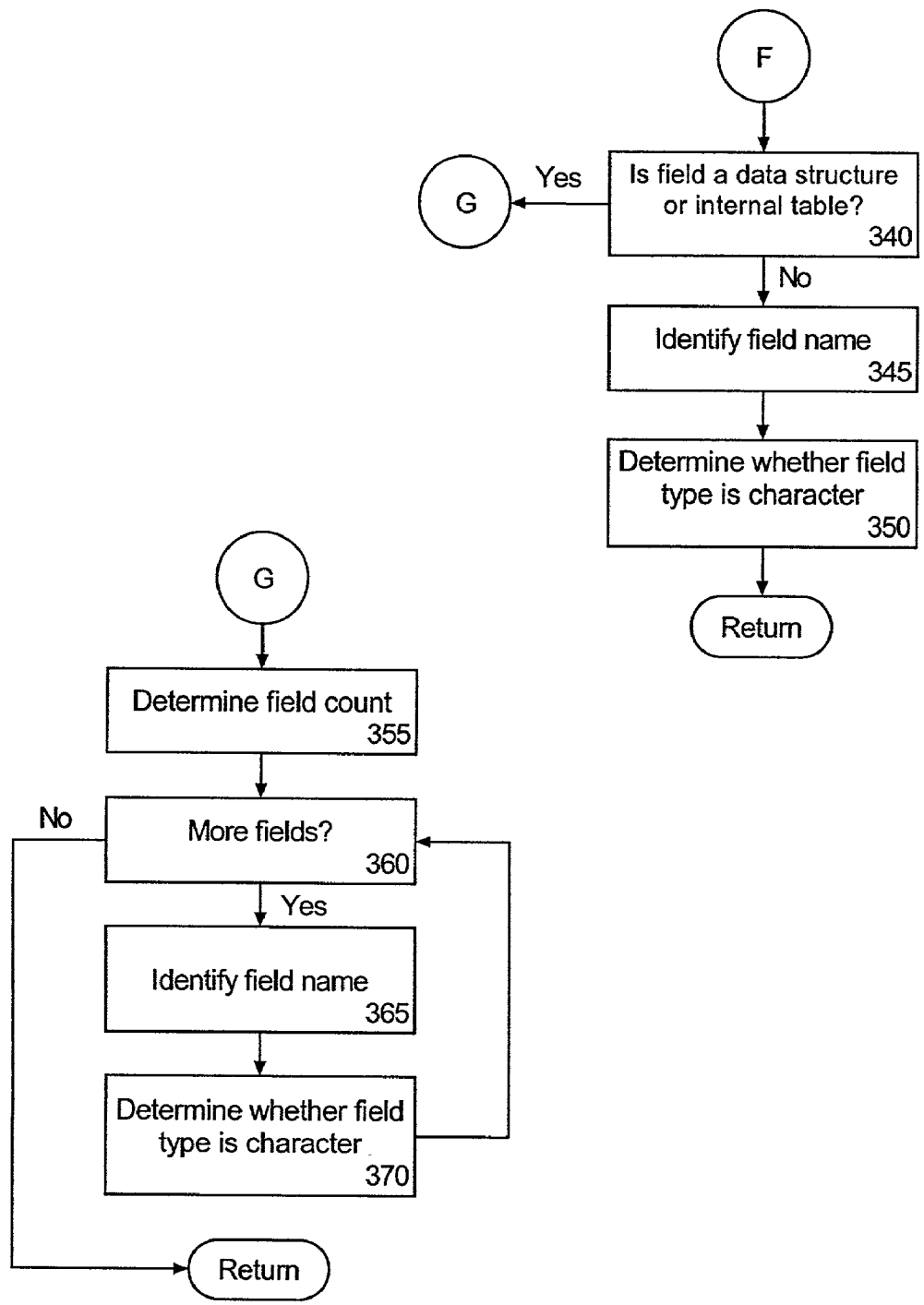
FIG. 3B is a series of flow charts illustrating additional methods for processing remote function call meta data.

FIGS. 3A and 3B, taken collectively, are flow charts illustrating a recursive method of processing meta data describing an RFC interface. As is known to those skilled in the art, RFC meta data describes the hierarchical organization of the methods, parameter descriptions, and fields, all of which comprise an RFC interface. In FIG. 3A, the method can continue from jump circle A to step 305 where the method descriptor and the number of parameter descriptors can be determined from the meta data describing the RFC interface. In step 310, if additional parameter descriptors have yet to be processed, the method can continue to step 315. If not, the method can return. In step 315, the parameter name and field descriptor can be determined. After completion of step 315, the method can continue to jump circle D.

Continuing from circle D, parameter descriptor information can be processed. In step 325, a determination can be made as to whether the parameter being analyzed has an associated table. If so, the parameter can be so identified, for example, a "?" can be associated with the parameter name. In that case, the method can jump to step 335. If, however, the parameter is not associated with a table, the method can continue to step 330. In step 330, a determination can be made as to whether the parameter is mandatory and must be included within the electronic document definition. This determination can include identifying the number of occurrences an element can have within the electronic document definition. Specifically, the element can be designated to appear one time or not at all, or can be designated to appear exactly one time. If the parameter is designated as mandatory, that is, the parameter must appear exactly one time, the parameter can be so identified. For example, a " " can be associated with the parameter name.

Continuing with step 335, a further determination can be made as to whether the parameter is imported, exported, or both. For example, a parameter descriptor that is imported is to be included within the request electronic document definition, while a parameter descriptor that is exported is to be included within the response electronic document definition. Parameter descriptors identified as both imported and exported are to be included within both the request and response electronic document definitions. After completion of step 335, the method can continue to jump circle F and then to jump circle E.

In FIG. 3B, continuing from jump circle F, field information of the RFC meta data can be processed. In step 340, a determination can be made as to whether the field being processed is a data structure, an internal table, or an individual element. If the field descriptor specifies that the field is a data structure or internal table, the method can continue to jump circle G to process the data structure or table as the case may be. If the field descriptor indicates that the field is a single element, the method can continue to step 345, where the field name of the individual element can be determined. In step 350, a determination can be made as to whether the field descriptor specifies that the field type is character. The field name and the field descriptor data type can be stored until such time when the data is to be written to the electronic document definition. After completion of step 350, the method can return.

Continuing from jump circle G, structure information can be processed. Accordingly, in the case where the field was determined to be a data structure or an internal table, the method can continue to step 355 where a field count of the data structure or internal table can be determined. In step 360, a determination can be made as to whether additional fields must be processed. If so, the method can continue to step 365. If not, the method can return. In step 365, the field name can be identified. In step 370, a determination can be made as to whether the field descriptor specifies that the field data type is character. The field name and field descriptor type can be stored until such time that the electronic document definition is created. When all of the fields of the internal table or data structure have been processed the method can return.

Figure 4A:
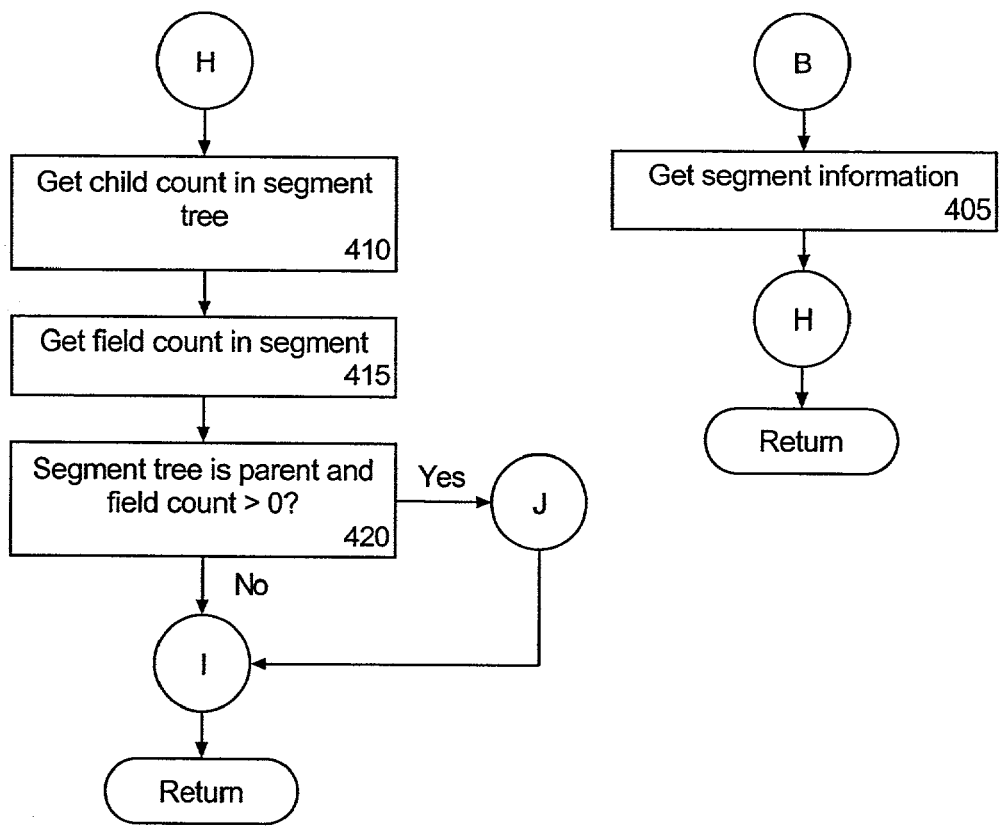
FIG. 4A is a series of flow charts illustrating methods for processing intermediate document meta data.
Figure 4A:
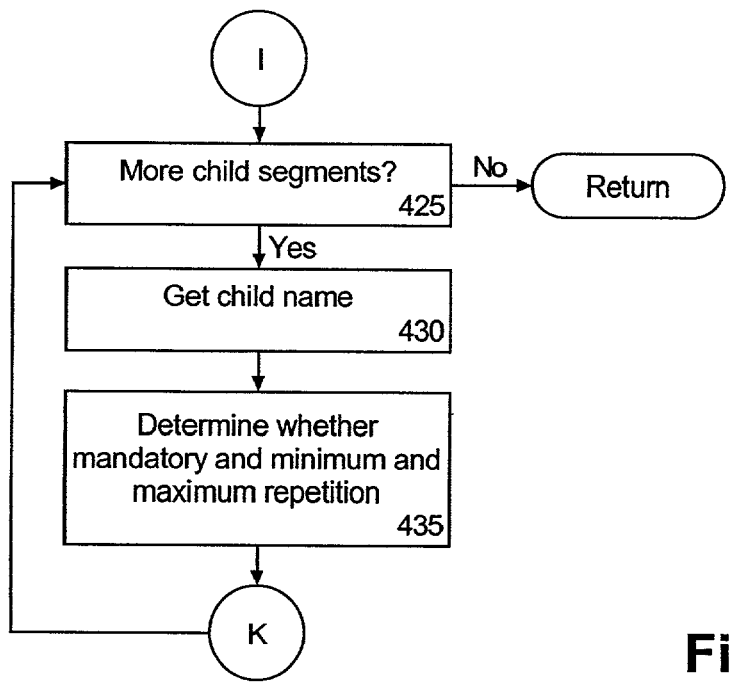
Figure 4B:
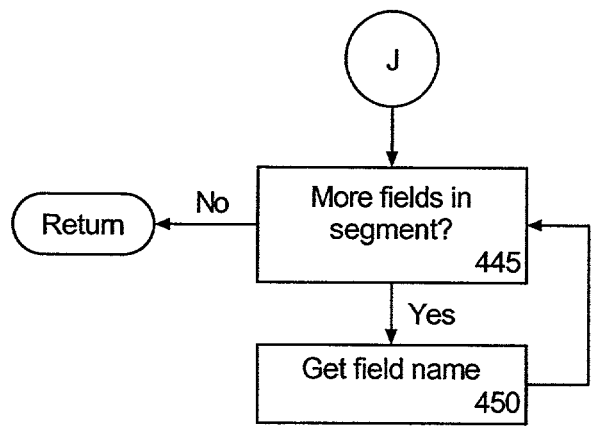
FIG. 4B is a series of flow charts illustrating additional methods for processing intermediate document meta data.
Figure 4B:
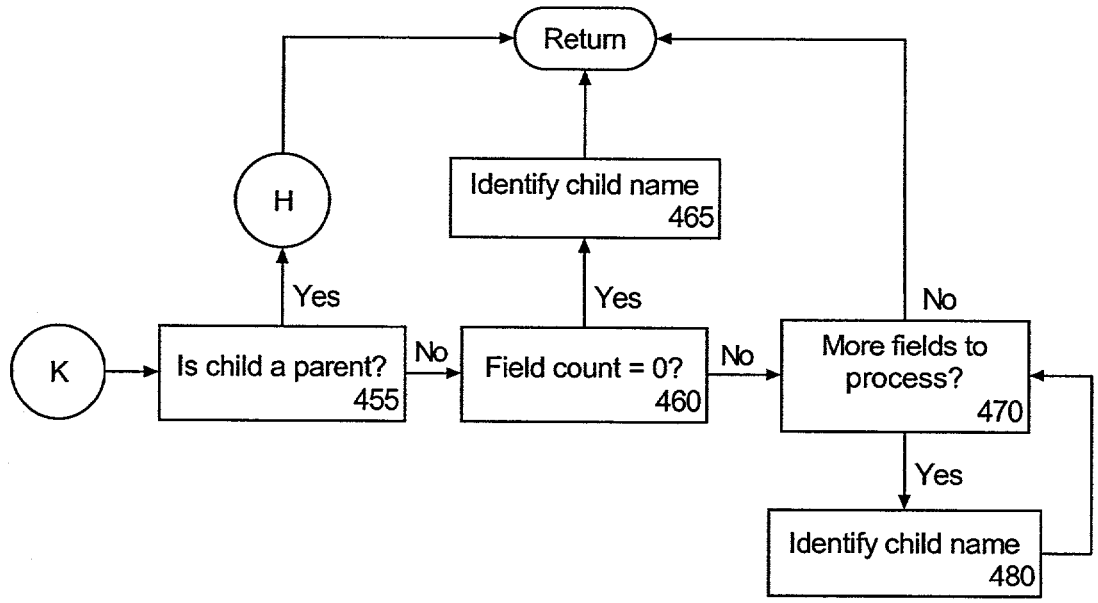

FIGS. 4A and 4B, taken collectively, are flow charts illustrating a recursive method for processing meta data describing an IDoc interface. As is known to those skilled in the art, the meta data describing an IDoc interface specifies the hierarchical structure of segments, fields, parents, and children which comprise an IDoc interface. In FIG. 4A, the method can continue from jump circle B to step 405 where segment data can be obtained. The method can continue to jump circle H, and after returning from jump circle H, the method can return back to FIG. 2.

Continuing from jump circle H, the tree information of the IDoc meta data can be processed. In step 410, a child count in the segment tree can be determined. In step 415, the field count in the segment can be determined. In step 420, a determination can be made as to whether the segment tree is a parent and the field count is greater than zero. If so, the method can continue to jump circle J, and upon returning, to jump circle I. If not, the method can continue to jump circle I. Notably, the method can again return after returning from jump circle I.

Continuing from jump circle I, the method can continue to step 425 where a determination can be made as to whether more child segments exist, and therefore, must be processed. If more child segments exist, the method can continue to step 430. If no more child segments exist, the method can return. In step 430, the name of the child being processed can be determined. In step 435, a determination can be made as to whether the child is mandatory, for example, whether the child must appear in the electronic document definition, as well as the minimum and/or maximum number of times the child can be repeated. After completion of step 435, the method can continue to jump circle K prior to looping back to step 425 to process more children.

In FIG. 4B, proceeding from jump circle J, fields of the IDoc meta data can be processed. In step 445, a determination can be made as to whether additional fields in the segment must be processed. If so, the method can continue to step 450. If not the method can return. In step 450, the field name of the segment can be determined. For example, the field name can be identified and stored in a vector for storing fields so that the field name can be recalled at a later time when the electronic document definition describing the IDoc interface is generated. The method can continue to loop until all of the fields have been processed. At that time, the method can return.

Continuing from jump circle K, in step 455, a determination can be made as to whether the child element being processed is also a parent. If so, the method can continue to jump circle H prior to returning. If not, the method can continue to step 460 to determine whether the field count is zero. If so, the method can continue to step 465 where the child name can be identified. For example, the child name can be added to a fields vector if it has not already been included. The method then can return. If the field count was not equal to zero, the method can continue to step 470. In step 470, a determination can be made as to whether additional fields must be processed. If so, the method can continue to step 475 where the child name can be identified. As mentioned, the child name can be added to the fields vector. The method can repeat until no fields are left to process as determined in step 470 and then return.

Figure 5A:
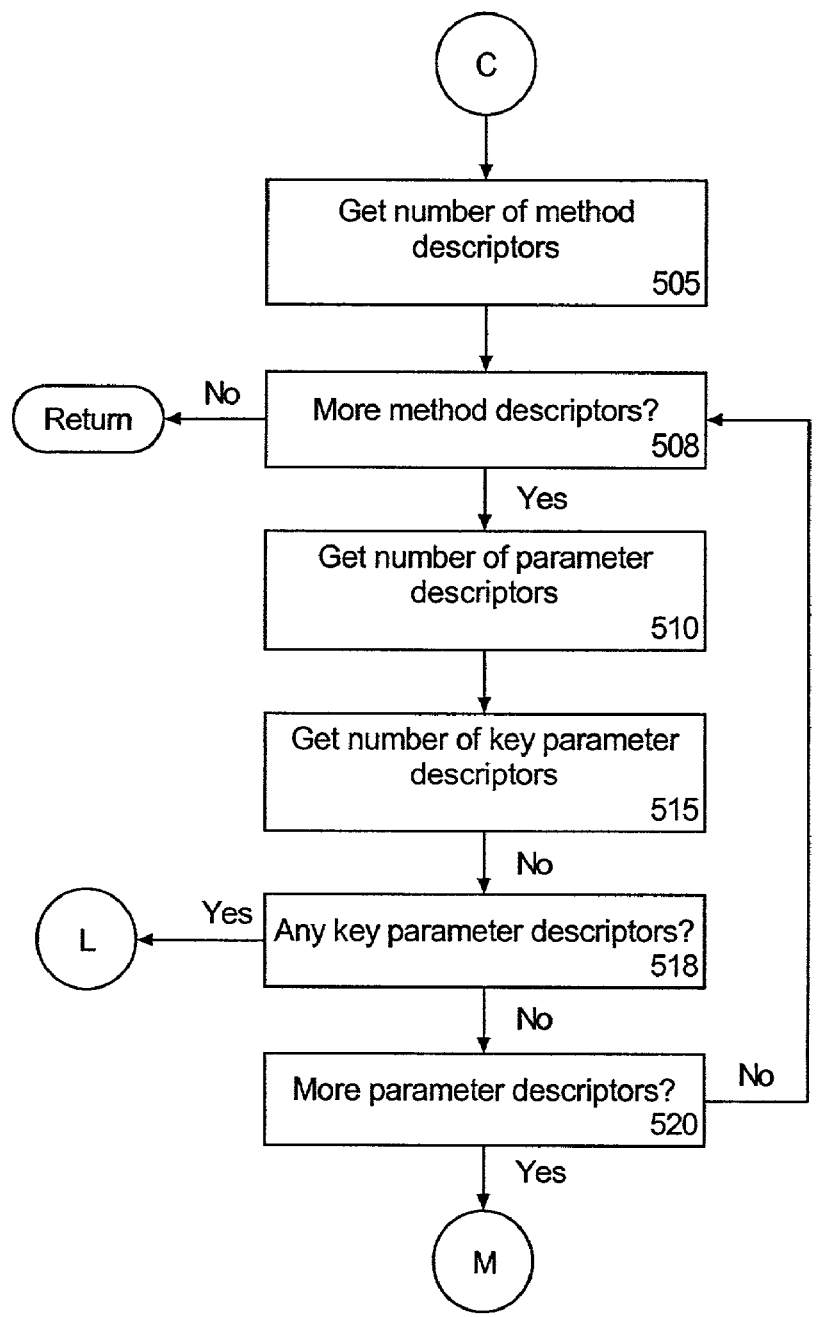
FIG. 5A is a flow chart illustrating a method for processing business application programming interface meta data.
Figure 5B:
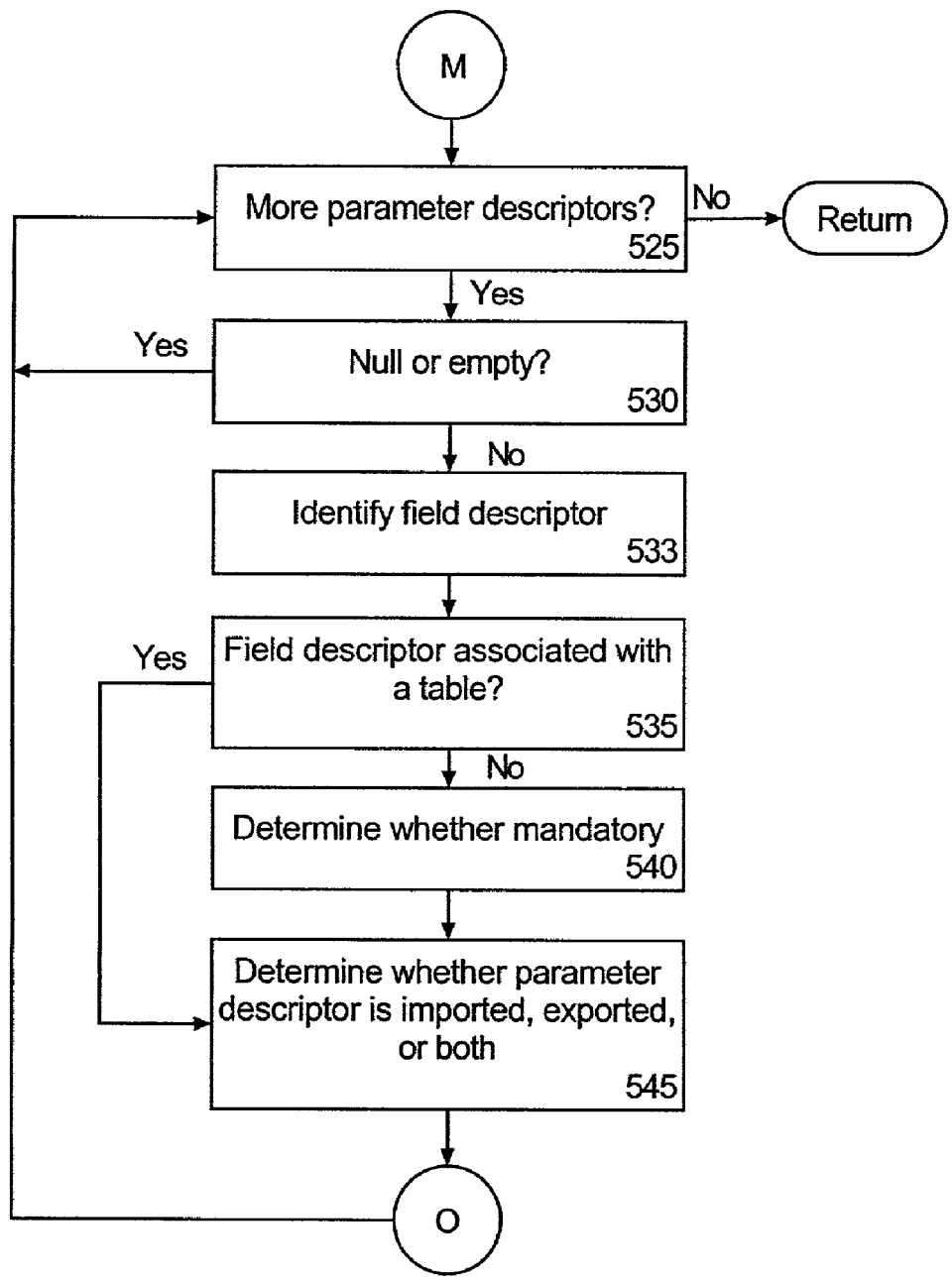
FIG. 5B is a flow chart illustrating a method for processing business application programming interface meta data.
Figure 5C:
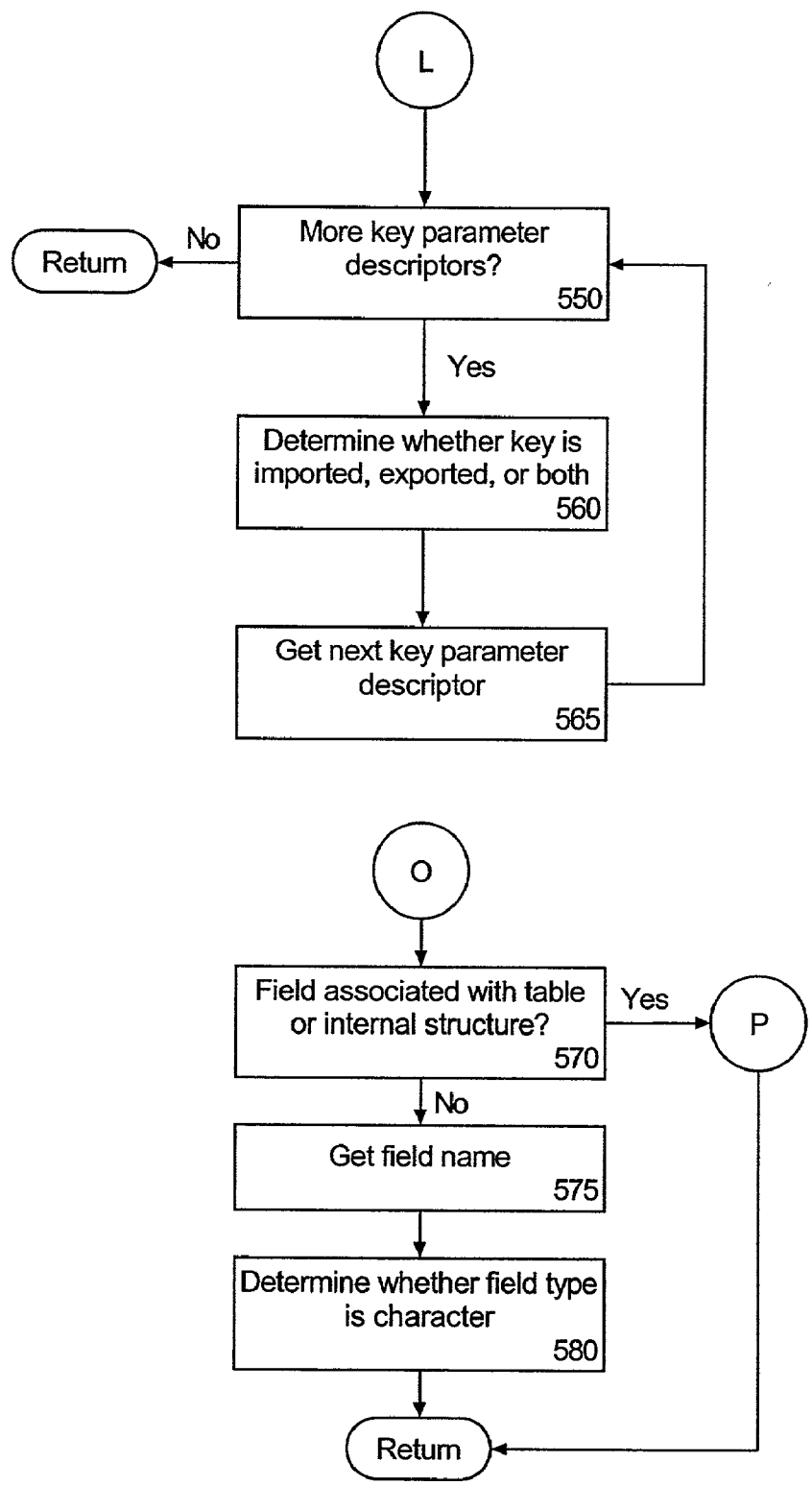
FIG. 5C is a series of flow charts illustrating additional methods for processing business application programming interface meta data.

FIGS. 5A, 5B, and 5C, taken collectively, are flow charts illustrating a recursive method for processing meta data describing a BAPI interface. The meta data describing a BAPI interface specifies the hierarchical structure of methods, parameters, and fields which comprise a BAPI interface. As is known to those skilled in the art, the BAPI interface is similar to the RFC interface with the noted exception that the BAPI interface can include more than one method. Accordingly, in FIG. 5A, the method can continue from jump circle C to step 505 where the number of method descriptors can be determined. In step 508, a determination can be made as to whether more method descriptors must be processed. If not, the method can return. If additional method descriptors must be processed, the method can continue to step 510. In step 510, the number of parameter descriptors can be determined and in step 515, the number of key parameter descriptors can be determined. In step 518, a determination can be made as to whether any key parameter descriptors remain to be processed. If so, the method can continue to jump circle L. If not, the method can continue to step 520. In step 520, a determination can be made as to whether additional parameter descriptors are to be processed. If so, the method can continue to jump circle M. If not, the method can loop back to step 508 to process additional method descriptors.

In FIG. 5B, continuing with jump circle M, the method can continue with step 525 where a determination can be made as to whether additional parameters descriptors must be processed. If not, the method can return. If so, the method can continue to step 530. In step 530, a determination can be made as to whether the parameter is a null or is empty. If so, the method can loop back to step 525 to process a next parameter descriptor. If not, the method can continue to step 533. In step 533, the field descriptor can be identified. In step 535, a determination can be made as to whether the field descriptor is associated with a table. If so, the method can continue to step 545. If not, the method can proceed to step 540 to determine whether the field is mandatory. In step 545, a determination can be made as to whether the parameter descriptor is imported, exported, or both. After completion of step 545, the method can continue to jump circle O prior to looping back to step 525.

Continuing with jump circle L in FIG. 5C, key information can be processed. Accordingly, in step 550 a determination can be made as to whether more key parameter descriptors must be processed. If so, the method can continue to step 560, where a determination can be made as to whether the key is to be imported, exported, or both. Proceeding to step 565, the next key and parameter descriptor can be obtained prior to looping back to step 550 to process further key parameter descriptors.

From jump circle O, the method can continue to step 570 to begin processing field information. In step 570, a determination can be made as to whether the field is associated with an internal table or data structure. If so, the method can continue to jump circle P and then return. If not, the method can continue to step 575 where the field name can be determined. In step 580, a determination can be made as to whether the field type is character. After step 580, the method can return.

Figure 5D:
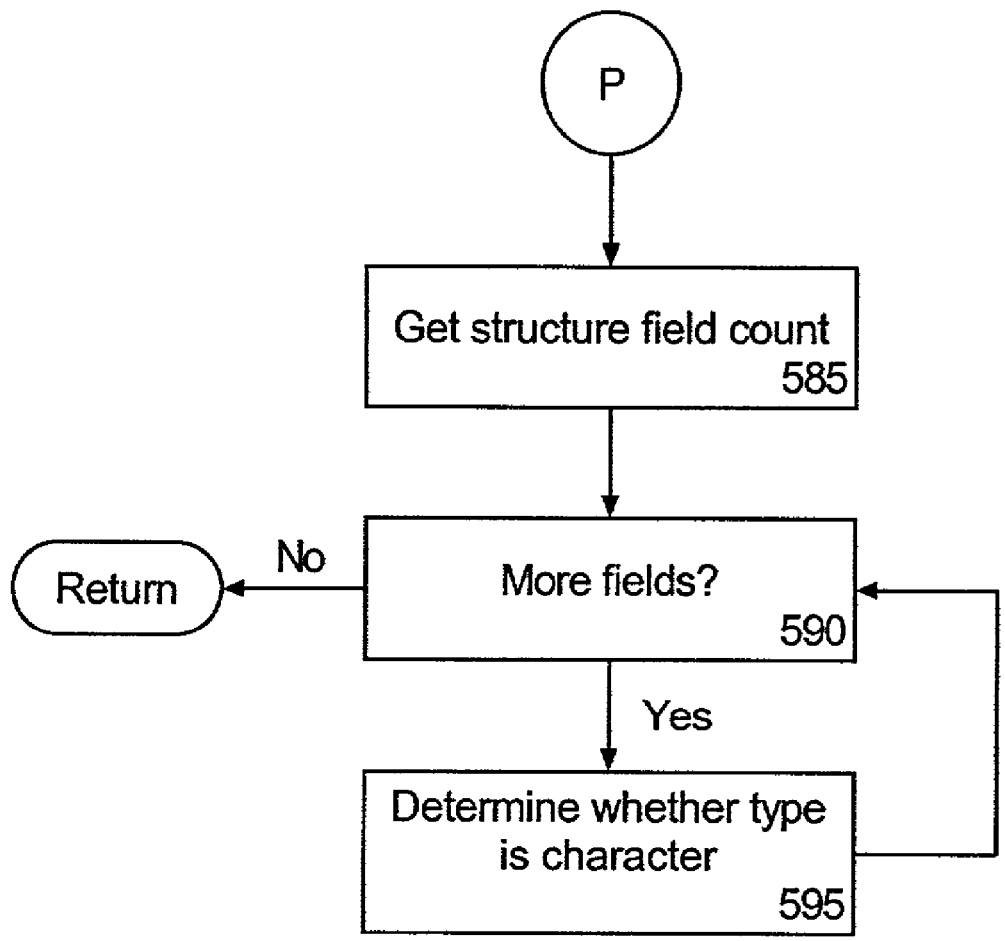
FIG. 5D is a flow chart illustrating an additional method for processing business application programming interface meta data.

Continuing with FIG. 5D, structure information can be processed. From jump circle P, the method can proceed to step 585, where the structure field count can be determined. In step 590, a determination can be made as to whether more fields must be processed. If not, the method can return. If so, however, the method can continue to step 595 to determine whether the data type of the field is character. From step 595, the method can loop back to step 590 until no more fields are left to process.

It should be appreciated by those skilled in the art that the various methods described with regard to FIGS. 3-5 are to be recursively applied to the meta data describing the particular interface until the meta data has been completely processed. As mentioned, after processing the meta data corresponding to the particular interface type, the method can return to generate an electronic document definition which can include request and response electronic document definitions. Accordingly, having been temporarily stored in various data structures, the information determined and/or identified from the meta data using the methods described herein can be written to an electronic document definition. As a result, the electronic document definition describes the specific interface to which it is associated. The electronic document definition further can be compliant with the specifications of the ERP system associated therewith and can be used in various tools such as adapter builders, XML editors, or various interactive development environment tools. The HTML output can be used as user documentation.

The invention disclosed herein provides an automated method of determining electronic document definitions. By accessing the meta data interface of an application or ERP system, the meta data for one or more particular interfaces to the ERP system or application can be retrieved. The methods described herein provide for a recursive approach to processing the meta data, whether the meta data corresponds to a BAPI, IDoc, or RFC type ERP system interface.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically creating an electronic document definition and generating an adapter, comprising:
   reading an input data file and processing the input data file by an electronic document definition generator to identify at least one target interface of a pre-selected application, for which meta data is to be obtained, and a meta data interface of said pre-selected application through which meta data can be obtained;

querying said pre-selected application using said meta data interface of said pre-selected application to obtain meta data describing one of said at least one identified target interface of said pre-selected application;

receiving said meta data responsive to said querying;

processing said received meta data to generate at least one electronic document definition describing said one of said at least one identified target interface based upon said received meta data, said at least one electronic document definition being configured for use by an adapter builder, said at least one electronic document definition being a DTD (document type definition), a markup language or an extensible markup language document;

supplying said at least one electronic document definition to said adapter builder;

said adapter builder generating an adapter based upon said at least one electronic document definition, wherein said generated adapter is configured to construct a message specification of said pre-selected application to communicatively link said pre-selected application to at least one application different than said pre-selected application;

said meta data processing step further comprising determining an interface type described by said meta data, wherein the interface type comprises at least one of a remote function call and a business application programming interface; and for meta data describing said remote function call or said business application programming interface, determining a request electronic document definition and a response electronic document interface.

2. The method of claim 1, wherein the interface type is selected from the group consisting of remote function call, intermediate document, and business application programming interface.

3. The method of claim 1, wherein said meta data specifies at least one parameter, said meta data processing step further comprising:
determining whether said parameter is mandatory.

4. The method of claim 3, said meta data processing step further comprising:
determining whether said parameter is imported, exported, or both.

5. The method of claim 1, wherein said meta data specifies at least one field, said meta data processing step further comprising:
determining a type of said at least one field.

6. The method of claim 1, wherein said meta data specifies at least one field, said meta data processing step further comprising:
determining whether said at least one field is associated with a table.

7. A computer program product machine-readable storage medium, having stored thereon a computer program having a plurality of code sections executable by a machine for causing the machine to perform the steps of:

reading an input data file and processing the input data file by an electronic document definition generator to identify at least one target interface of a pre-selected application, for which meta data is to be obtained, and a meta data interface of said pre-selected application through which meta data can be obtained;

querying said pre-selected application using said meta data interface of said pre-selected application to obtain meta data describing one of said at least one identified target interface of said pre-selected application;

receiving said meta data responsive to said querying;

processing said received meta data to generate at least one electronic document definition describing said one of said at least one identified target interface based upon said received meta data, said at least one electronic document definition being configured for use by an adapter builder, said at least one electronic document definition being a DTD (document type definition), a markup language or an extensible markup language document;

supplying said at least one electronic document definition to said adapter builder;

said adapter builder generating an adapter based upon said at least one electronic document definition, wherein said generated adapter is configured to construct a message specification of said pre-selected application to communicatively link said pre-selected application to at least one application different than said pre-selected application;

said meta data processing step further comprising determining an interface type described by said meta data, wherein the interface type comprises at least one of a remote function call and a business application programming interface; and for meta data describing said remote function call or said business application programming interface, determining a request electronic document definition and a response electronic document interface.

8. The machine-readable storage medium of claim 7, wherein the interface type is selected from the group consisting of remote function call, intermediate document, and business application programming interface.

9. The machine-readable storage medium of claim 7, wherein said meta data specifies at least one parameter, said meta data processing step further comprising:
determining whether said parameter is mandatory.

10. The machine-readable storage medium of claim 9, said meta data processing step further comprising:
determining whether said parameter is imported, exported, or both.

11. The machine-readable storage medium of claim 7, wherein said meta data processing step further comprising:
determining a type of said at least one field.

12. The machine-readable storage medium of claim 7, wherein said meta data specifies at least one field, said meta data processing step further comprising:
determining whether said at least one field is associated with a table.

* * * * *